United States Patent [19]

Kawasaki et al.

[11] 4,292,140

[45] Sep. 29, 1981

[54] PROCESS FOR RECOVERING HEAT IN DISTILLATION PROCESS

[75] Inventors: Hiroaki Kawasaki, Ichihara; Shigeharu Akashi, Narashino, both of Japan

[73] Assignees: Ishikawajima-Harima Jukogyo Kabushiki Kaisha; Idemitsu Kosan Company Limited, both of Tokyo, Japan

[21] Appl. No.: 120,765

[22] Filed: Feb. 12, 1980

[30] Foreign Application Priority Data

Feb. 13, 1979 [JP] Japan .................................. 54-15175

[51] Int. Cl.³ .......................... B01D 3/14; C10G 7/00
[52] U.S. Cl. .................................... 203/22; 203/23; 203/27; 203/98; 203/DIG. 8; 203/DIG. 9; 203/DIG. 14; 203/DIG. 19; 196/134; 208/353
[58] Field of Search ..................... 203/21–27, 203/DIG. 9, DIG. 19, DIG. 14, 99, 98, DIG. 8; 196/134; 208/353; 202/176, 202

[56] References Cited

U.S. PATENT DOCUMENTS

| 1,744,261 | 1/1930 | Cooke | 196/134 |
| 1,852,184 | 4/1932 | Milliff et al. | 196/134 |
| 1,945,581 | 2/1934 | Wallis | 196/134 |
| 1,947,817 | 2/1934 | Wallis | 208/353 |
| 2,140,450 | 12/1938 | Danforth | 208/353 |
| 3,079,330 | 2/1963 | Stone | 208/353 |
| 4,025,398 | 5/1977 | Haselden | 203/DIG. 19 |
| 4,032,412 | 6/1977 | Hoppe et al. | 203/22 |

FOREIGN PATENT DOCUMENTS 910055  11/1962  United Kingdom ................. 203/22

*Primary Examiner*—Wilbur L. Bascomb, Jr.
*Attorney, Agent, or Firm*—Alfred E. Miller

[57] ABSTRACT

In a distillation process, the heats of distillates and bottom product are recovered to preheat the feed and to generate the steam of higher than 5 kg/cm² G which in turn may be utilized to improve the distillation efficiency.

6 Claims, 2 Drawing Figures

PROCESS FOR RECOVERING HEAT IN DISTILLATION PROCESS

BACKGROUND OF THE INVENTION

The present invention relates to a process for recovering heat in a distillation process.

In the petroleum refining, petrochemical and oil and fat industries where feeds such as crude oil, bottom products after atmospheric distillation, fatty acids and so on are subjected to distillation to obtain various products as distillates and bottom products, it has become a very urgent problem how to recover the heat which has been hitherto wasted in cooling processes because the costs of fuels have increased tremendously and will steadily increase so that the energy savings are essential.

Referring to FIG. 1, a prior art distillation process will be described. The feed flows through a main feed pipe c and is preheated successively by heat exchangers i, h and g inserted into the side-stream product withdrawing pipes f, e and d. Thereafter the feed is further preheated when it passes through a heat exchanger k inserted into the bottom product or residue withdrawing line j, is heated by a heating furnace b and is charged into a distillation column a.

The separation of various side-stream products is effected based upon the difference in boiling temperature among them. Light components thus separated are withdrawn through the lines d, e and f and heat exchangers g, h and i, transfering their heats to the feed flowing through the main feed line c. As a result, the side-stream products are cooled to about from 130 to 230° C. They are further cooled by coolers l, m and n, which use the water or air as coolant, to the temperatures at which they may be safely stored, and they are stored in storage tanks q, r and s as the final or intermediate products.

Part of the side-stream product, which is obtained from the point closest to the top of the distillation column a is returned through a return line o to the top of the distillation column a as a reflux after having been cooled by the cooler n in order to improve the separating efficiency. The bottom product flows through the pipe line j into the heat exchanger k where it transfers its heat to the feed which has been preheated to some extent when it passed through the heat exchangers i, h and g as described above. The bottom product is further cooled by a cooler p and stored in a storage tank t as the final or intermediate product. Even though not shown, low-pressure steam generators may be disposed upstream of the coolers l, m, n and p.

As described above, according to the prior art distillation process, the heats of the distillates and bottom product are used to preheat the feed, thereby attaining the savings of energy. However, as will be described below, the prior art distillation processes have some serious problems in view of the energy savings. Firstly, the feed is preheated successively by the respective higher-temperature portions of the distillates and bottom product of the lines f, e, d and j in the order, the boiling temperatures of the products of these lines being increased in the order named. As a result, the heats of these products are not recovered to a satisfactory extent. That is, in order to attain a high heat exchange efficiency between two liquids, the higher the difference in temperature between them, the better. However, the feed is preheated to a considerably high temperature by the distillate with the lowest boiling point of the line f so that when it flows into the heat exchanger h, the difference in temperature becomes less between the feed and the distillate with the next-lowest boiling temperature of the line e. The temperature difference becomes further less as the feed flows into the heat exchanger g and into the heat exchanger k. In order to keep a desired amount of heat exchanging when the temperature difference is less, the surface of the heat exchanger must be increased, but it is impossible to increase it infinitely from the technical and economical standpoints. As a result, it has been the general practice to make the temperature difference as high as possible between the feed preheated in the preceding stages and a side-stream product or bottom product with a higher boiling temperature. However, this arrangement results in the unsatisfactory heat recovery from a side-stream product with a lower boiling point. As a consequence, the temperature of the side-stream product with the lower boiling temperature is too high to feed the product directly into a storage tank, so that a cooler must be provided to cool the product further to a desired level. In addition, the product is made to flow through a low-pressure steam generator (not shown) as described elsewhere, but the pressure of the steam obtained is so low as less than 5 kg/cm$^2$ G. As a result, the use of the steam is limited and an excessive quantity of the steam is left.

Furthermore, the heats of the side-stream products and the bottom product are taken away substantially by the coolant such as water or air so that the prior art distillation processes cannot attain the heat recovery to a satisfactory degree.

In view of the above, the primary object of the present invention is to provide a process which may recover the heats from the side-stream and bottom products which have been hitherto wastefully taken away by the cooling water or air when passed through the coolers. The present invention will become more apparent from the following description of one preferred embodiment thereof taken in conjunction with the accompanying drawings.

DETAILED DESCRIPTION OF THE PREFERRED EMBODIMENT

Figure 2:
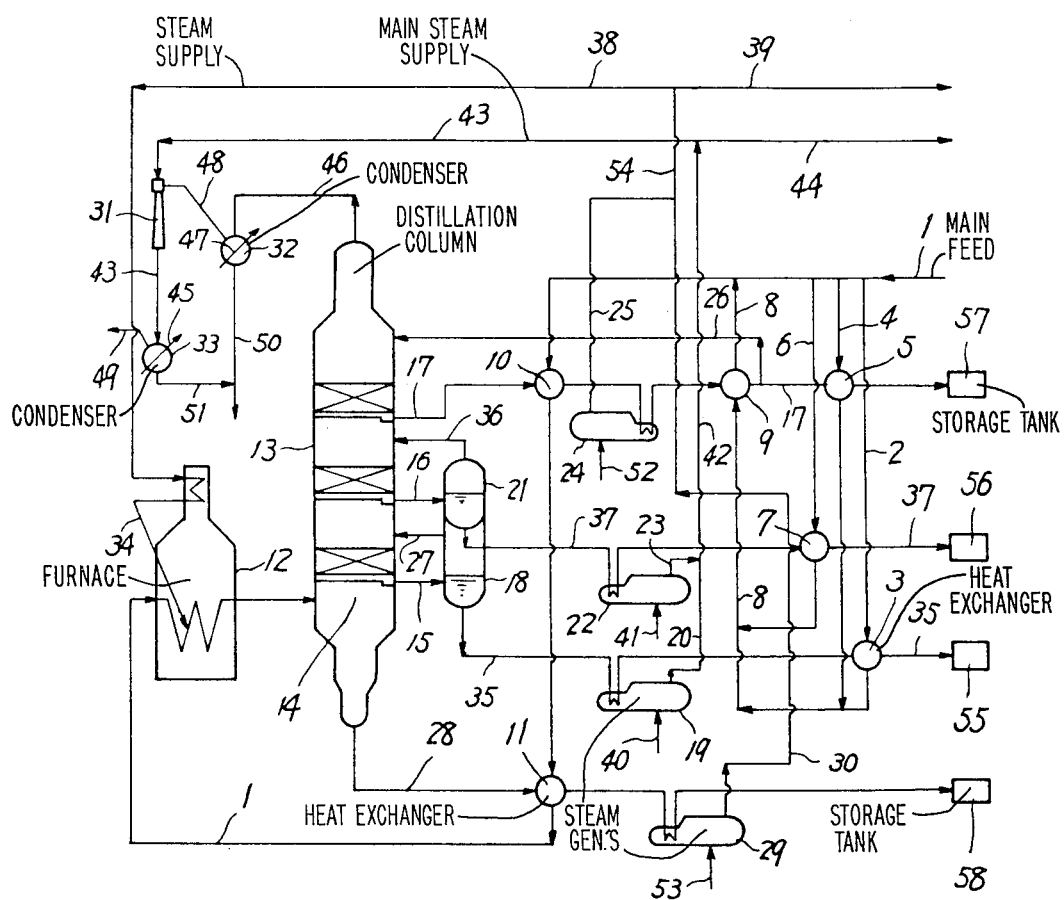
FIG. 2 is a block diagram used for the explanation of a process for recovering heat in distillation in accordance with the present invention.

The present invention will be described with reference to FIG. 2 where the heat recovery process of the present invention is shown as being applied to a vacuum distillation unit.

A first distillate product I discharged from a lowermost tray in a distillation column 13 flows through a first distillate withdrawing pipe 15 into a first distillate receiving vessel 18. The vapors of light components which are not condensed and remain in the upper portion of the first vessel 18 are returned through a return line 27 to the distillation column 13. The bottom of the first vessel 18 is connected with a first storage tank 55, which stores the first distillate I, through a pipe 35, a high-pressure steam generator 19 and a heat exchanger 3.

A second distillate product II discharged from the intermediate tray flows through a second distillate withdrawing pipe 16 into a second vessel 21 for receiving the second distillate product II. The vapors of light components which are not condensed and remain in the upper portion of the second vessel 21 are returned through a pipe line 36 to the distillation column 13 while the bottom of the vessel 21 is connected with a second distillate product storage tank 56, through a pipe 37, a high-pressure steam generator 22 and a heat exchanger 7.

A third distillate product III discharged from an uppermost tray of the column 13 flows through a third distillate withdrawing pipe line 17 into a third distillate product storage tank 57, the pipe line 17 extending through a heat exchanger 10, a medium-pressure steam generator 24 and two further heat exchangers 9 and 5. Part of the third distillate product III leaving from the heat exchanger 9 is returned through a reflux pipe line 26 to the distillation column 13 as a reflux in order to get a high separation efficiency.

The bottom product flows through a bottom product withdrawing pipe line 28 into a bottom product storage tank 58, the pipe line 28 extending through a heat exchanger 11 and a medium-pressure steam generator 29.

A main feed line 1 is branched to first, second and third branched lines 2, 4 and 6 which in turn are connected with the heat exchangers 3, 5 and 7, respectively. The discharge pipes from these exchangers 3, 5 and 7 are joined to a common pipe line 8 which in turn is connected with the main feed line 1 through the heat exchanger 9.

The main feed line 1 downstream of the joint with the pipe line 8 extends through the heat exchangers 10 and 11 a heating furnace 12 and is connected with the flash zone 14 at a lower portion of the distillation column 13.

A boiler water 40 is fed into the high-pressure steam generator 19 and the steam generated flows through a steam pipe 20 which is joined to a common steam pipe line 42 which in turn is connected with main steam supply lines 43 and 44. In like manner, a boiler water 41 is fed into the high-pressure steam generator 22 and the steam generated is supplied to the common steam pipe 42 through a steam line 23.

The first steam supply line 43 is connected with a steam ejector 31 which in turn is connected with a condenser 33. The steam ejector 31 has a function of maintaining the vacuum pressure in the distillation column 13 while the condenser 33 has a function of cooling with a cooling water 45 the steam discharged from the ejector 31, thereby condensing the steam. The condensed water flows through a discharge pipe 51 into a discharge pipe line 50 to be described below.

The second steam supply line 44 is connected with a fuel atomizing device (not shown) of the heating furnace 12.

The overhead vapor flows through an exhaust pipe 46 into a condenser 32 which cools and condenses the overhead product with a cooling water 47. The gas separated from the overhead product in the condenser 32 flows through a discharge pipe 48 into the ejector 31. In like manner, the gas separated in the condenser 33 is connected through an exhaust pipe 49 with an exhaust gas processing device (not shown). Both the liquids from the condensers 32 and 33 flow through the exhaust pipe line 50 into a discharged liquid treating or processing device (not shown).

A boiler water 52 is fed into the medium-pressure steam generator 24 and the steam generated flows through a steam pipe 25 which in turn is connected with a medium-pressure steam supply line 54. In like manner, a boiler water 53 is fed into the medium-pressure steam generator 29 and the steam generated flows through a steam pipe 30 which in turn joins the medium-pressure steam supply line 54.

The medium-pressure steam supply line 54 is branched into first and second medium-pressure steam distibution lines 38 and 39. The first steam distribution line 38 is extended through the convection zone in the heating furnace 12 so as to be superheated, and the superheated medium-pressure steam is injected into the main feed line 1 in the heating furnace 12 through a pipe 34, whereby the flow rate of the feed to be charged into the distillation column 13 may be increased. In addition, the injected medium-pressure steam introduced into the flash zone 14 in the distillation column 13 serves to maintain the partial pressures in the column 13 constant. The medium-pressure steam flowing through the second medium-pressure steam distribution line 39 is utilized to heat various pipings in the distillation.

Next the mode of operation of the heat recovery system with the above construction will be described in more detail below. Reduced crude oil at about 75° C. after atmospheric distillation is fed to the main feed pipe line 1. Part of the feed flows through the first branched pipe 2 into the heat exchanger 3 where the first distillate product I having cooled to some extent by travel through the pipe 35 heats the feed to about 110° C. In like manner, the feed branched to flow through the second branched pipe 4 is heated to about 110° C. when passing through the heat exchanger 5 by the heat exchange with the distillate product III flowing through the pipe 17. The feed branched into the third branched pipe 6 is also preheated to about 150° C. when passing through the heat exchanger 7 by the heat transferred from the second distillate product II flowing through the pipe 37. The feeds preheated by the heat exchangers 3, 5 and 7, respectively, as described above, flow into the common pipe 8 and is further preheated in the heat exchanger 9 by the third distillate product III flowing through the pipe 17 to about 160° C. Thus preheated feed flows again into the main feed line 1 and joins with the feed which has not been preheated. Thereafter the feed is preheated by the heat exchangers 10 and 11 and flows through the heating furnace 12 where the superheated, medium-pressure steam under the pressure of from 5 to 15 kg/cm$^2$ G is injected into the feed as described elsewhere. As a result, the feed is heated to about from 350° to 400° C. before it is charged into the flash zone 14 in the distillation column 13. The distillates are withdrawn through the pipes 15, 16 and 17 from the distillation column 13.

The first distillate product I whose temperature is about 350° C. is withdrawn through the pipe 15 into the first distillate receiving vessel 18. The vapors of light components are returned through the pipe 27 to the distillation column 13 while the first distillate product I is transported by a pump (not shown) into the first distillate product storage tank 55. While flowing through the pipe 35, the first distillate product heats and evaporates the boiler water 40 in the high-pressure steam generator 19, thereby generating the steam at from 15 to 25 kg/cm$^2$ G and further preheats the feed flowing through the branched pipe 2 in the heat exchanger 3. As a result, the first distillate product I drops to about less 100° C. before it flows into the storage tank 55.

The second distillate product II which is withdrawn through the pipe 16 and is at about 320° C. flows into the second receiver 21 and the vapors of light components are returned through the pipe 36 to the distillation column 13 while the second distillate product is pumped by a pump (not shown) to flow through the pipe line 37 into the second storage tank 56. While flowing through the pipe line 37, the second distillate product II heats and evaporates the boiler water 41 in the high-pressure steam generator 22, thereby generating the steam at from 15 to 25 kg/cm² G and further preheats the feed flowing through the third branched pipe 6 in the heat exchanger 7. As a result, the temperature of the feed drops to about less than 100° C. before it flows into the second storage tank 56.

The third distillate product III which is withdrawn through the pipe 17 and is about 260° C. preheats the feed flowing through the main feed line 1 in the heat exchanger 10 so that the temperature of the third distillate product III drops to about 220° C. Thereafter the third distillate product III flows through the medium-pressure steam generator 24, heating and evaporating the boiler water 52 to generate the steam of from 5 to 15 kg/cm² G. After leaving the steam generator 24, the third distillate product III flows into the heat exchanger 9, preheating the feed flowing through the common pipe 8 so that the temperature of the third distillate product III leaving the heat exchanger 9 drops to about 150° C. Part of the third distillate product III leaving the heat exchanger 9 flows as a reflux through the reflux return pipe 26 into the distillation column 13 in order to improve the separation efficiency. The remaining third distillate product III flows into the heat exchanger 5, preheating the feed flowing through the second branched pipe 4 so that the temperature of the third distillate product III drops less than 100° C. before it flows into the storage tank 57.

The bottom product which is at about 360° C. flows through the pipe 28 into the heat exchanger 11, preheating the feed flowing through the main feed line 1, so that the temperature of the bottom product drops to about 230° C. The bottom product then flows through the medium-pressure steam generator 29, heating and evaporating the boiler water 53 into the medium pressure steam of from 5 to 15 kg/cm² G so that the temperature of the bottom product drops to less than 150° C. before it flows into the storage tank 58.

The high-pressure steam generated in the high-pressure steam generators 19 and 22 flows through the steam pipes 20 and 23 into the collecting pipe 42. Part of the high-pressure steam flows through the steam supply line 43 into the steam ejector 31 which in turn so operates as to maintain the pressures in both the exhaust or discharge pipes 46 and 48 negative. The steam is discharged from the steam ejector 31 through the pipe 43 into the condenser 33 and the condensate is transported through the discharge pipes 51 and 50 to the discharged liquid treatment system (not shown) as described elsewhere, while the vapor is discharged through the discharge pipe 49 into the exhaust gas treating device (not shown).

Since the interior pressures of the discharge pipes 46 and 48 are maintained negative by the steam ejector 31 as described above, part of the overhead vapor, which are not condensed in the distillation column 13, is sucked into the condenser 32 through the discharge or overhead pipe 46. The condensate or liquid is discharged through the pipe line 50 to the discharged liquid treatment system (not shown), while the vapor is sucked through the pipe 48 by the steam ejector 31 and charged along with the high-temperature steam flowing through the main steam supply line 43 into the condenser 33 from which the vapor is discharged through the discharge pipe 49 into the exhaust gas treating device (not shown). The discharge of vapors from the distillation column 13 from the top thereof results in the pressure reducing in the column 13 so that the vaporization of the feed may be facilitated and consequently the distillation efficiency may be remarkably improved.

The high-pressure steam also flows through the second high-pressure steam supply line 44 to the heating furnace 12 and is used to atomize the fuel as described elsewhere.

The medium-pressure steam generated in the medium-pressure steam generators 24 and 29 flows through the steam pipes 25 and 30 into the collecting pipe 54. Part of the medium-pressure steam flows through the first medium-pressure steam supply line 38 which is extended through the convection zone in the heating furnace 12 so that the steam is superheated. Thus superheated steam is injected into the main feed line 1 extending through the furnace 12 in order to assist the charging of the feed into the flash zone 14 in the column 13.

The steam flowing through the second medium-pressure steam supply line 39 is used to heat various pipes in the distillation plant.

Figure 1:
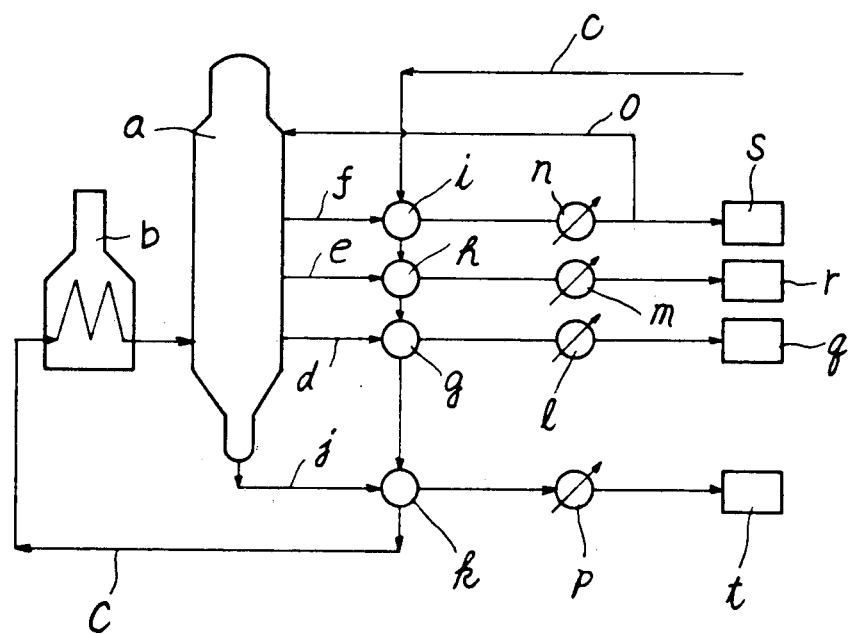
FIG. 1 is a block diagram of a prior art distillation process.

Next the advantages of the heat recovery process in accordance with the present invention over that of the prior art (See FIG. 1) will be described. Table below shows the comparison between the present invention and the prior art when both are applied to the vacuum distillation plant with the capacity of 57,000 barrels per day (BPSD).

|  | the prior art | the invention |
|---|---|---|
| heat wasted through cooler | 14.1 × 10⁶ kcal/H | 0 |
| power required for driving the fan of the air cooler | 138 KWH | 0 |

From the Table on Page 12 it is apparent that the present invention may recover all the heat of $14.1 \times 10^6$ kcal/H which has been hitherto taken away wastefully by the cooler. More particularly, according to the present invention, of the heat recovered, $3.1 \times 10^6$ kcal/H (which is about 22% of the recovered heat) is used to preheat the feed so that the fuel to the heating furnace 12 may be saved by the same amount. The remaining heat of $11 \times 10^6$ kcal/H (about 78% of the recovered heat) is recovered in the form of the high-and medium-pressure steams from the steam generators and is utilized within the distillation plant. As a result, the supply of the thermal energy equivalent to the high-pressure steam of 19.8 T/H which has been supplied from the exterior may be reduced.

In addition, the air-cooling type coolers are all eliminated so that the electric power of 138 KWH for driving the cooling fans may be saved. Furthermore the noise pollution problem arising from the cooling fans may be eliminated. Thus the present invention can not only attain the energy savings but eliminate the environmental problems.

So far the present invention has been described in detail in conjunction with the distillation column 13 from which three side-stream products I, II and III are withdrawn, but it is to be understood that various modifications may be effected without the departure from the true spirit of the present invention. For instance, as many side-stream products as desired may be withdrawn. In this case, the piping system including the distillate product receiving vessels or separators, steam generators and heat exchaners must be modified. Furthermore the distillate product receiving vessels such as 18 and 21 shown in FIG. 2 may be eliminated. It is also possible to provide coolers for emergency shut down and so on which may cool the final or intermediate products to be stored in the tanks.

The effects, features and advantages of the present invention may be summarized as follows:

(I) The heats of various fractions may be recovered in the form of the steam at high and medium pressures higher than 5 kg/cm$^2$ G. Thus generated steam may be utilized within the distillation plant so that the supply of the steam from the exterior may be eliminated, whereby the considerable saving in energy may be attained.

(II) The heats of various fractions may be also used to preheat the feed so that the fuel to be burned in the heating furnace may be saved in considerable amounts, whereby the energy savings may be attained.

(III) The feed may be used as a coolant for cooling the fractions to low temperatures at which they may be safely stored in the tanks. As a result, the coolers using the air or water as the coolant may be eliminated and the heats which have been hitherto taken away wastefully into the atmosphere through the cooling air or water may be recovered and utilized.

What is claimed is:

1. In a fractional distillation process for fractionating a feed in a distillation column to obtain various fractions and bottom product, the process for recovering heat in a distillation processing installation comprising the steps of (a) branching a main flow of the feed into a plurality of flows, (b) preheating said branched flows of the feed with sensible heats of the fractions flowing out of the distillation column in heat exchange therebetween, (c) joining said preheated branched flows to said feed, (d) preheating said feed having been joined with said preheated branched flows with sensible heats of at least one of the fractions and bottom product flowing out of the distillation column in heat exchange therebetween, (e) feeding the preheated feed to the distillation column through a heating furnace thereby fractionating the same into a plurality of flows of fractions depending upon difference in boiling temperature among said fractions, (f) generating saturated steam under pressure of higher than 15 kg/cm$^2$ G by heating boiler water with sensible heats of at least one of said fractions having higher boiling temperature among said fractions in heat exchange therebetween in at least one first steam generator, (g) thereafter preheating at least one of said branched flows of the feed in heat exchange with the same with at least said one of said fractions having higher boiling temperature thereby cooling at least said one of said fractions to a temperature at which it may be safely stored in its storage tank, (h) preheating the feed having been joined with the branched flows with sensible heats of another at least one of said fractions having lower boiling temperature than that of the first-mentioned at least one of said fractions, and in heat exchange therebetween, (i) generating saturated steam under pressure of higher than 5 kg/cm$^2$ G by heating boiler water with sensible heat of said another at least one of said fractions in heat exchange therebetween in at least one second steam generator, (j) and then preheating another at least one of said branched flows in heat exchange of the same with said another at least one of said fractions having lower boiling temperature thereby cooling said another at least one of said fractions to a temperature at which it may be safely stored in its storage tank.

2. The process as set forth in claim 1 further comprising generating saturated steam under pressure of higher than 5 kg/cm$^2$ by heating boiler water in heat exchange with the same with said bottom product in a third steam generator after the step of preheating said feed having been joined with said preheated branched flows with sensible heats of said bottom product in heat exchange therebetween, thereby cooling said bottom product to a temperature at which it may be safely stored in its storage tank.

3. The process as set forth in claim 1 or 2 wherein vapors of light components in said at least one of said fractions having higher boiling temperature are returned to the distillation column.

4. The process as set forth in claim 1 or 2 wherein part of another at least one of said fractions having a lower boiling temperature is returned as a reflux to the distillation tower.

5. The Process as set forth in claim 3 wherein part of another at least one of said fractions having lower boiling temperature is returned as a reflux to the distillation tower.

6. In a distillation process for distilling a feed in a distillation column in order to obtain various distillates and bottom product, the process for recovering heat comprising the steps of: providing a main flow of feed, providing a plurality of branches from said main flow of feed to form branched flows, preheating said branch flows with heat provided by the lower temperature flow portions of the distillates flowing out of said distillation column, providing a source of water and heat exchangers to form steam generators, said generated steam being higher than 5 kg/cm$^2$ by utilizing higher temperature flow portions of said distillates, and whereby said distillates may be cooled without the use of coolers to temperatures at which they may be stored safely in respective storage tanks.

* * * * *